Jan. 10, 1933.    H. G. LYKKEN    1,893,710
FLUID IMPELLER
Filed June 12, 1929    2 Sheets-Sheet 2

Inventor:
Henry G. Lykken
By: Wallace R Lane
Atty.

Patented Jan. 10, 1933

1,893,710

UNITED STATES PATENT OFFICE

HENRY G. LYKKEN, OF MINNEAPOLIS, MINNESOTA

FLUID IMPELLER

Application filed June 12, 1929. Serial No. 370,174.

The present invention relates to the impelling of fluidal bodies and more in particular to the impelling of material laden fluid bodies.

Among the objects of the invention is to provide a novel device for and novel method of conveying material laden fluid bodies to a point of use. Heretofore, when it was desired to convey a material laden fluid body to a point of use, such a body was directed into the impelling elements of a rotating fan member.

The introduction of a fluidal body, such as air or water carrying in suspension material of a gritty character, such as gravel, pulverized coal or the like, into the impelling elements of a rapidly rotating fan member whereby the individual particles of suspended material impinge against the surfaces of these elements and to be later thrown out or directed to a place of use, could be effected only by the continual and constant replacement of these elements due to wear.

The abrasive action of these gritty substances in their travel into and along the surfaces of the impelling elements caused excessive wear of the same necessitating constant attention and replacement. The cost of such new impelling elements, together with the time consumed in making such replacements, was one of the big items of maintenance costs.

Furthermore, where it was desired to deliver uninterruptedly an amount of such material laden fluid body to a point of use, it was always necessary to install auxiliary units for operation while replacements were being made, thus increasing operation costs.

It is an object of the invention to provide a novel device for conveying material laden fluid bodies in which substantially the whole of such body is conveyed to a point of use without coming into contact with the impelling elements of the rapidly rotating member. Since substantially the entire amount of material does not come into contact with these impelling elements, the device is capable of operating uninterruptedly over greater periods of time without necessitating the replacement of worn out impelling elements because of wear. The decrease of maintenance costs is obvious. The rotating member or rotor is not a fan in the usual acceptation of the term.

The invention is applicable to the impelling of any material laden fluid body to a point of use, but for illustration it is herein described as a fuel impelling device and has for an object the impelling of a body of combustible supporter such as air, having suspended therein pulverized coal, the material laden body being impelled to a point of consumption such as furnaces or the like.

The invention comprehends the idea of providing a rapidly rotating member such as a rotor which might be said to resemble a fan in appearance but which functions differently from a fan, or the like for rapidly rotating or revolving a mass of air against the outer surfaces of which is directed a material laden fluid body, the frictional contact of the surfaces of the rotating or revolving fluid mass with the material laden fluid body, creating or setting up a vorticose movement or action within that portion of the body adjacent to the rotating mass whereby the body is impelled to a point of use.

It is an object of the invention to provide a novel device in which the material laden body is caused to move to a point of use without coming into direct contact with the elements of the rapidly rotating means. The rotor elements act as a clutch for the rapidly rotating fluid mass, the latter being the medium for impelling the material laden fluid.

In the specific embodiment selected to illustrate the invention, such means are shown as comprising a rotor having radially extending elements mounted on a hub which in turn is mounted on a power driven shaft extending through and into a scroll-shaped housing, the rotor being positioned adjacent to one of the walls of the chamber. An inlet means is provided in the opposite wall of the housing and is axially spaced from the edges of the rotor elements. The rapidly rotating rotor carries with it a mass of air which may be termed a fluid rotor. This fluid rotor in turn creates a vorticose movement of that portion of the material laden fluid body within the space between the rotor and inlet whereby the body is impelled through a discharge opening in the housing and tangential to the rotor and the vortex created by it, to a point of use.

It has been found from experimental tests under various conditions, such as the variations in the degree of concentration of the material laden fluid body, the speed of the rotating member and the fluid mass carried thereby, and the pressure desired at the discharge of the device, that by varying the distance between the inlet means and the rotating member, the vorticose movement of the body is varied, and by suitably adjusting this distance, a more perfect control of the material body at the point of use may be obtained.

It is an object therefore to provide adjustable means for varying this distance between the rotating member and the inlet means whereby control of the vorticose movemean of action in the space therebetween may be more perfectly effectuated. In the specific embodiment selected to illustrate the invention, such means comprises an annular angular ring of substantially the same diameter as the diameter of the rotating member and slidably mounted upon the end of a circular inlet conduit. Means connected to the ring and extending through the walls of the housing are provided for adjusting the position of the ring in respect to the rotating member.

Another object of the invention is to provide a rotating member having units readily detachably connected so as to be easily removed and replaced without removal of the entire rotor unit.

A further object of the invention is to provide a means in the walls of the housing which will permit ready access to the removable elements and to permit their easy replacement.

Referring to the drawings:

Fig. 3 is a view in perspective of a detached impelling element or blade of the rotating member of the device.

Figure 1:
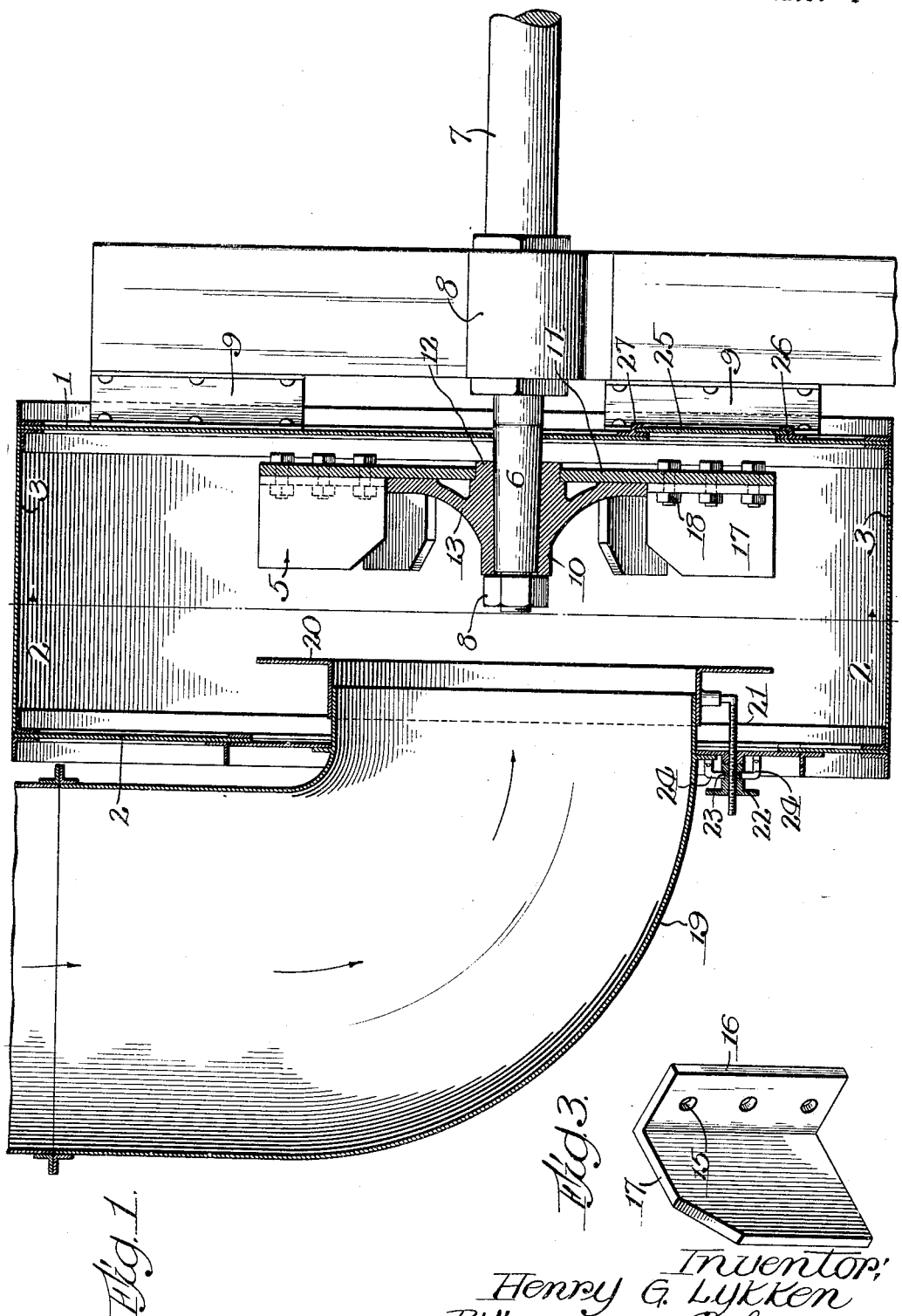
Fig. 1 is a transverse vertical cross sectional view of an embodiment selected to illustrate the invention.
Figure 2:
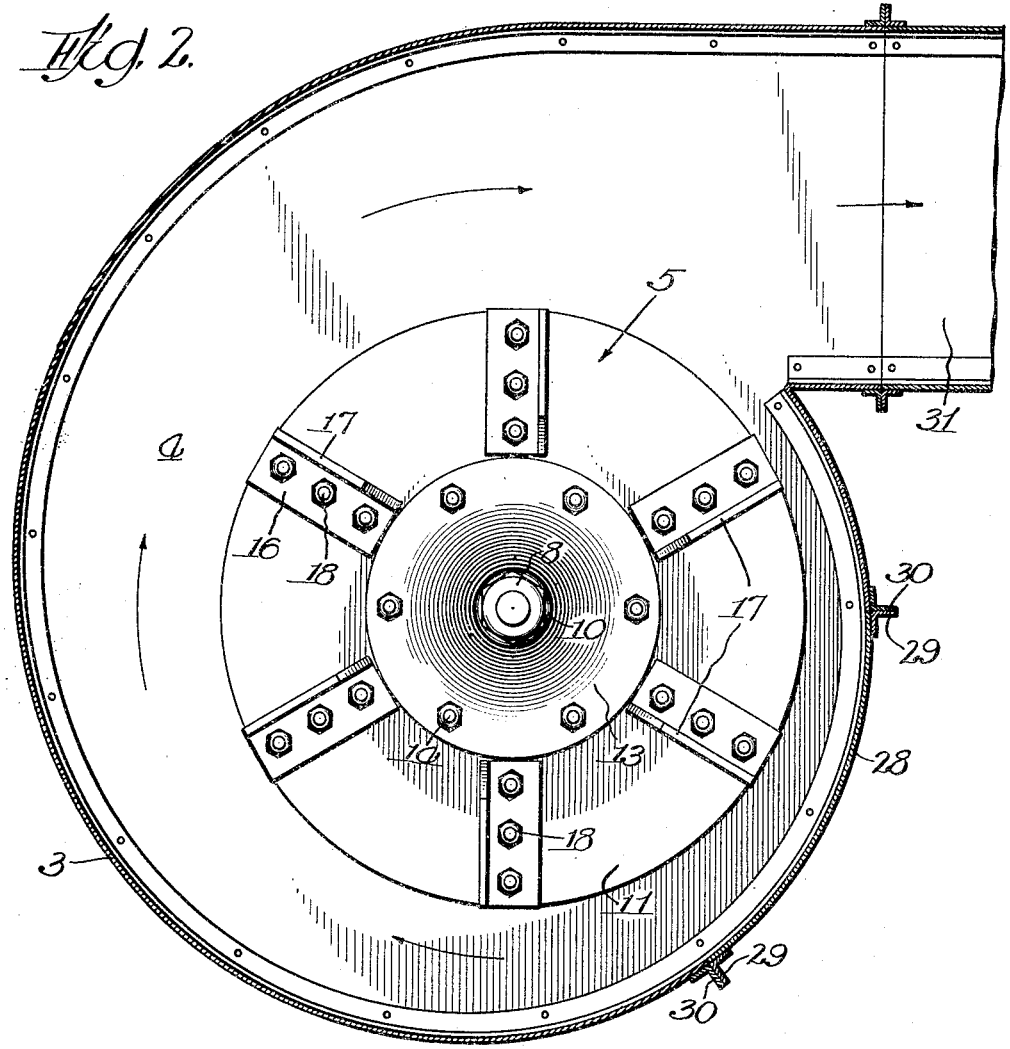
Fig. 2 is a longitudinal vertical cross sectional view taken in the plane represented by the line 2—2 of Fig. 1.
Figure 4:
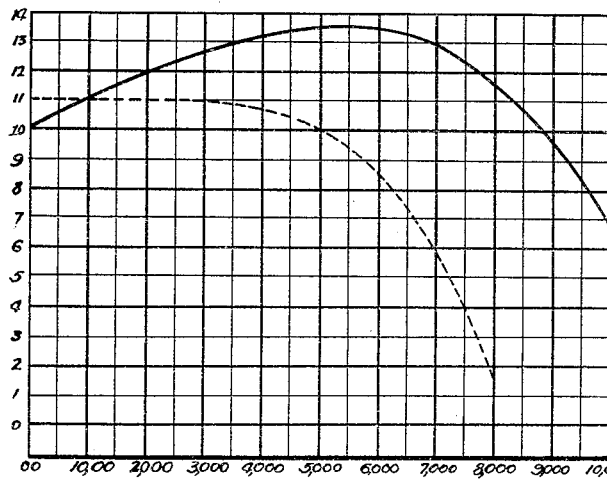

Fig. 4 is a graph showing the pressures in inches of water obtainable at a discharge point when delivering various quantities of a material laden fluid body of two rotors operating at the same speed and in the same housing, the dotted curve showing the performance of a radially operated fan, while the other of the curves show the performance of the device operating on the principle disclosed herein.

Referring now more in detail to the drawings, the embodiment selected to illustrate the invention is shown as comprising a housing having side walls 1 and 2 connected by a wall portion 3 to form therein a scroll-shaped chamber 4 in which is mounted a rotor 5. This rotor is mounted on the tapered portion 6 of a horizontal shaft 7 projecting through an aperture in the wall 1 of the housing and is secured thereto by the nut 8 engaging the threaded end of the shaft.

The shaft 7 is journalled in a suitable bearing 8 connected to the wall 1 by any suitable means, such as channel irons 9, and is driven by a source of power (not shown).

The rotor 5 comprises a hub 10 and an annular disc or plate portion 11, the plate portion or disc being mounted on an extending portion 12 of the hub and is connected to a flared disc portion 13 by any suitable means such as bolts 14. The annular disc 11 is provided at spaced intervals with radially spaced apertures adapted to register with similar apertures 15 provided in a flange 16 of the impelling elements 17, the elements being secured to the annular disc by such means as bolts 18 passing through the apertures.

Axially spaced from the rotor 5 and projecting through an opening in the wall 2 is an inlet means comprising a circular conduit 19 having slidably mounted on the end thereof an annular angular disc or ring 20. A threaded rod 21 having one end thereof secured to the angular ring 20 is provided and extends through the wall 2 and threadedly engages a hand nut 22 having an annular groove 23 engaged by fingers 24 mounted and secured to the wall 2. By turning the hand nut 22 in the fingers 24, the annular ring 20 will slide on the end of the conduit 19 to vary the distance between the end of the inlet means and the rotor.

A gate 25 slidable in the grooved members 26 and 27 is provided to close an opening formed in the wall 1. A bulkhead 28 having at the edge thereof angles 29 is adapted to close an opening in the wall 3, the angles 29 adapted to abut similar angles 30 along the edges of the opening, and are held in position by means such as bolts passing through the angles.

Whenever it is desired to replace any of the impelling elements, access thereto may be readily had by way of these openings in the housing.

The rotor 5 when rapidly rotated causes the mass of air surrounding it to rotate or revolve at a great speed, thus creating a fluidal mass rotor. The surfaces of this rapidly rotating mass of air when coming into frictional engagement with that portion of the material laden fluid body within that space between the inlet means and rotor, causes or creates a vorticose movement of that body portion whereby the body is expanded and impelled in substantially a tangential direction through the outlet 31 in the housing to a point of use.

It has been found by numerous tests and experiments that preferably the width of the space between the rotor and the inlet means should be substantially equal to the width of the impelling elements, or rather the axial thickness of the fluid mass rotor, although the results obtained by varying this distance far surpass the results obtained by the usual radial flow type of fan.

In the present device, substantially the entire amount of material in the material laden fluid body is impelled by the vorticose action. It has been found that only a very small portion of the material strikes or impinges against the forward edge of the impelling elements and causes but slight wear. The impelling elements used in the present device greatly outlast the impelling units or elements of the radial flow type device operating under the same conditions.

In Figure 4 of the drawings is shown graphs of the performance of two like or identical rotating members operating in the same housing and at the same speed, but one as a fan and the other as a rotor creator in accordance with the principle of this invention, the vertical coordinates of the diagram representing cubic feet per minute of a material fluid body being discharged, the horizontal coordinates representing the head in inches of water at which it is being discharged; the dotted curve representing the use of the rotor as a radial flow type in which the material laden fluid body is directed into the impelling elements of the rotor, the inlet opening being adjacent the blades and forming the eye of a fan construction, while the full lined curve represents the use of the same rotor as a means for creating a vorticose movement in the material laden fluid body between the rotor and inlet means.

This action occurs in a definite space between the inlet opening and the rotor elements. The superiority and efficiency of the rotor operated as disclosed in the present invention is apparent. A rotor operated as disclosed herein will deliver substantially twice the amount of material at from 40 to 60% greater pressure when operating at a point of maximum efficiency than a radial flow type fan or rotor of the same diameter and at the same speed operates at its point of maximum efficiency.

The impelling elements of the rotor when operated as indicated in the present invention will last from 5 to 10 times as long as the blades on a similar rotor operated as a radial flow type fan at the same speed and under similar conditions.

It is likewise possible to use a higher speed impeller since the diameter of the wheel need not be as great as a fan operating as a radial flow type.

While I have herein described and upon the drawings shown a specific embodiment illustrative of the invention, it is to be understood that this invention comprehends other structures, constructions, arrangement of parts, details and features, without departing from the spirit hereof.

Having thus disclosed the invention, I claim:

1. A fluid impelling device comprising a housing having a receiving space for the material to be impelled, means for delivering a material laden fluid body to said receiving space, means located outside of said receiving space for creating a vorticose movement of said material laden fluid body as it enters said space, and means for varying the volume of said receiving space so as to control the extent of vorticose movement.

2. A fluid impelling device comprising a housing having an inlet and an outlet and a receiving space adjacent to said inlet, means for delivering a material laden fluid body to said receiving space, a rotor located in said housing opposite to said inlet and laterally with respect to said space, said rotor having means for creating a vorticose movement of said material laden fluid body as it enters said space so that said body will be impelled from the housing, and means for varying the volume of said receiving space so as to control the extent of said vorticose movement.

3. A fluid impelling device comprising a housing having a receiving space for the material to be impelled, a conduit for delivering material to said space, means located outside of said receiving space for creating a vorticose movement of said material laden fluid body as it is delivered to said space, and means carried by the conduit for varying the volume of said space so as to control the extent of vorticose movement.

4. A fluid impelling device comprising a housing having a receiving space for the material to be fed, a conduit for delivering a material laden fluid body to said receiving space, a rotor located outside of said space and provided with means for creating a vorticose movement of said material laden fluid body as it enters said space from said conduit, and a member adjustably mounted on the delivery end of said conduit for varying the volume of said receiving space, so as to control the extent of said vorticose movement.

5. A fluid impelling device comprising a housing having a receiving space for the material to be impelled, a conduit for delivering a material laden fluid body to said receiving space, means located outside of the receiving space for creating a vorticose movement of said material laden fluid body as it enters the space, a flange adjustably mounted on the delivery end of said conduit, and means for adjusting said flange laterally with respect to said space so as to control the extent of vorticose movement.

6. A fluid impelling device comprising a housing, an inlet for a material laden fluid body, means providing an annular surface portion within said housing and around said inlet, means also within said housing and spaced from said surface portion for creating a vorticose movement of said body as it enters the housing, said movement of the body being set up within the space between said surface portion and said means, whereby said body is impelled to a point of use, and means for varying the volume of said space.

7. A fluid impelling device comprising a housing, an inlet for a material laden fluid body, means providing an annular surface portion within said housing and around said inlet, means also within said housing and spaced from said surface portion for creating a vorticose movement of said body as it enters the housing, said movement of the body being set up within the space between said surface portion and said means, whereby said body is impelled to a point of use, and means for moving said surface portion toward or away from said means for varying said vorticose movement.

8. A fluid impelling device comprising a housing, an inlet for a material laden fluid body, a member movably supported by said inlet and having an outwardly extending surface portion, means spaced from said portion for creating a vorticose movement of the material laden body as it enters said housing, said movement being set up within the space between said surface and means, whereby said body is impelled to a point of use, and means for moving said member for varying said space and said movement.

9. A fluid impelling device, comprising a housing, a rotor mounted therein, an inlet means for a material laden fluid body axially spaced from said rotor, an outlet means tangential to the periphery of said rotor, said rotor adapted to create a vorticose movement of said body in said space whereby the body is impelled through said outlet to a point of use, and means associated with said inlet means for varying the volume of said space so as to vary the vorticose movement of said body within said space.

In witness whereof, I hereunto subscribe my name to this specification.

HENRY G. LYKKEN.